United States Patent
Weiderman Sandahl et al.

(10) Patent No.: US 9,727,393 B2
(45) Date of Patent: Aug. 8, 2017

(54) METHOD, APPARATUS AND COMPUTER PROGRAM FOR ANALYSING EVENTS IN A COMPUTER SYSTEM

(71) Applicant: Unomaly AB, Stockholm (SE)

(72) Inventors: Göran Weiderman Sandahl, Stockholm (SE); Johan Gustafsson, Stockholm (SE)

(73) Assignee: UNOMALY AB

( * ) Notice: Subject to any disclaimer, the term of this patent is extended or adjusted under 35 U.S.C. 154(b) by 172 days.

(21) Appl. No.: 14/541,402

(22) Filed: Nov. 14, 2014

(65) Prior Publication Data

US 2015/0095921 A1 Apr. 2, 2015

Related U.S. Application Data

(63) Continuation of application No. PCT/SE2013/050556, filed on May 16, 2013.

(60) Provisional application No. 61/647,743, filed on May 16, 2012.

(51) Int. Cl.
| | | |
|---|---|---|
| *G06F 9/44* | (2006.01) | |
| *G06F 9/54* | (2006.01) | |
| *G06F 17/30* | (2006.01) | |
| *G06F 11/30* | (2006.01) | |
| *G06F 11/34* | (2006.01) | |

(52) U.S. Cl.
CPC .......... *G06F 9/542* (2013.01); *G06F 11/3072* (2013.01); *G06F 17/30997* (2013.01); *G06F 11/3476* (2013.01); *G06F 2201/805* (2013.01); *G06F 2201/835* (2013.01)

(58) Field of Classification Search
None
See application file for complete search history.

(56) References Cited

U.S. PATENT DOCUMENTS

| | | | |
|---|---|---|---|
| 8,176,527 B1 * | 5/2012 | Njemanze ............. | G06F 21/554 709/223 |
| 2008/0243463 A1 | 10/2008 | Lovas et al. | |
| 2008/0276253 A1 | 11/2008 | Khandrika et al. | |
| 2008/0301124 A1 | 12/2008 | Alves et al. | |
| 2009/0019149 A1 * | 1/2009 | Cohen et al. ................. | 709/224 |
| 2010/0011031 A1 * | 1/2010 | Huang ................ | H04L 63/1408 707/E17.007 |

(Continued)

*Primary Examiner* — Andy Ho
*Assistant Examiner* — Abdou Seye
(74) *Attorney, Agent, or Firm* — Gabriela B. Tomescu, Esq.; Bergenstråhle & Partners AB

(57) ABSTRACT

A method, an apparatus and computer program for analyzing events in a computer system, the method comprises receiving an event, splitting the event into a meta part and a content part. The method further comprises comparing the meta part by matching the meta part with meta parts from previous events. The method further comprises determining that the meta part is new, and when the meta part is determined new storing the meta part and the content part. The method further comprises wherein when the meta part is determined not new, comparing the content part by matching with previous content parts with the same meta part. The method further comprises determining that the content part is new, and when the content part is determined new, storing the content part, thereby enabling analyzing events in a computer system and presenting events as new.

20 Claims, 14 Drawing Sheets

LEARNING

INCOMING EVENTS ARE KEPT IN A STORE WITH METALOG AS KEY, AND OBJLOG AS UNDERLYING KEYS HOLDING COUNTS AND OTHER META DATA. IF NO METALOG EXISTS, A NEW IS ADDED (a) OTHERWISE THE MATCHING ONE IS "UPDATED" WITH THE NEW OBJLOG (c). IF OBJLOG EXISTS, IT IS UPDATED (b)

(56) References Cited

U.S. PATENT DOCUMENTS

| | | | |
|---|---|---|---|
| 2010/0115614 A1* | 5/2010 | Barile et al. | 726/22 |
| 2010/0180158 A1 | 7/2010 | Corry et al. | |
| 2011/0055637 A1* | 3/2011 | Clemm | H04L 41/0816 714/39 |
| 2013/0173539 A1* | 7/2013 | Gilder | G06F 17/30578 707/622 |

\* cited by examiner

Fig. 3 EVENT FLOW

METHOD, APPARATUS AND COMPUTER PROGRAM FOR ANALYSING EVENTS IN A COMPUTER SYSTEM

This application is a continuation of PCT Application No. PCT/SE2013/050556, filed May 16, 2013, which claims benefit of U.S. Provisional Application 61/647,743, filed May 16, 2012, the entire contents of each of which are hereby incorporated by reference.

BACKGROUND

The present disclosure relates generally to a method, apparatus and a computer program for analysing events in a computer system.

Computer systems continuously generate events as effects of internal actions within hardware or software, and as part of effects of external stimuli from users, neighbouring computer systems etc. These events are often referred to as logs, traps or messages and there exists an ecosystem of solutions that uses these information sources for solving various computer related problems such as trouble shooting, detecting failure, detecting security violations etc. Monitoring of information technology infrastructure, such as servers, switches, routers and workstations, business systems and transaction systems, not limiting other types of similar units, typically consists of the following approaches:

Network monitoring: Analyses data flow to see network load, latency, path etc. May warn if too high/low load is identified.

Health monitoring: Collects information from the source, which for example may include: CPU, disk space, memory usage, and may warn if this approaches 100% (or "too much"). It may also warn if a system cannot be reached by continuously polling infrastructure.

Intrusion Detection: May for example analyse data flows and logs and match these against a signature database consisting of signatures of known attack-patterns of hackers, viruses and/or trojans. If a match is found, a warning is triggered.

Intrusion Prevention: Has the same approach as Intrusion Detection, but does not only warn, it also potentially drops the offending packet.

Log Management: Collects logs from infrastructure and generates reports from user input values. It enables warnings from configured thresholds and levels. Some of it also parses the logs into more "human-readable" strings.

Security Information and Event Management: Analyses logs, traffic flows, vulnerability information and other security related information sources typically by performing "event correlation". Has often search functionality, similar to log management, but potentially more limited.

Activity and performance monitoring: Analyses events from applications (typically web) for application-specific performance problems and user activity Anti fraud: Analyses events from financial systems and/or web systems in order to detect if a session is fraudulent.

There are collective problems with these approaches.

Typically they are niche, attempting to solve a very specific problem such as detecting if a host is out of disk, or that a specific security attack occurs—this means that users will need to adopt multiple solutions to cover their "issues" and potentially there will be gaps in between them which will cause blind spots.

Typically, they carry to some degree a definition-based approach, whereby they need input from user or vendor on the structure of data and what to look for. This means that they are limited to finding pre-defined situations, which means that they are very reliant on good users and good default vendor "definitions". The act of defining "bad" situations creates a great degree of bias in the detection capability which typically results in both false-positives and false-negatives.

Typically the definition-based approach also brings a varying degree of manual maintenance for the solution to continuously perform as specified, and this is mainly due to the fact that they rely on events having certain defined structures, that finding events requires defining search filters and triggering alerts requires definition of "if-then-else"-type rules. All these definitions will need to be updated with time, sometimes as frequently as every day.

Typically, they are "effect-based", meaning they detect a situation that is the "effect" of a problem and not the actual cause. They mostly have problems describing the events leading up to the "effect" which often results in the solution not assisting the actual process of "fixing" the issue.

Since they rely on definitions of "bad", false-positives are typically a problem. This often leads to the fact that users of these solutions try to "limit" the false positives by 1) making less data input (less logs) and 2) "tuning" thresholds and rules so they don't trigger. Both of these approaches results in a decreased detection capability, leading to limiting the value of the solution in case of incidents.

Infrastructure monitoring best-practices such as ISO 27001 (ISO/IEC 27001:2005—Information technology—Security techniques—Information security management systems—Requirements) and PCI DSS (Payment Card Industry Data Security Standard) require continuous log analysis which is very difficult and expensive using the above products since it means manually searching the logs.

Some of the solutions are not real time oriented at all—e.g. search based—and thus don't fit well in creating understanding of critical situations as they happen or are underway.

The systems that have real time functionality are typically very rule set based, and work by memorising some sequences of events according to a user-defined rule set. The result of this detection process is typically very basic and "simple", since the rule set needs to be "understandable" to the user. Solutions for monitoring information systems today are not satisfactory since they fail at detecting many incidents, and bring little/limited value once incidents happen, and have large continuous costs associated with them.

SUMMARY

It is an object of the invention to address at least some of the problems and issues outlined above. It is possible to achieve these objectives and others by using a method, an apparatus and a computer program as defined in the attached independent claims.

According to one aspect, a method is provided for analysing events in a computer system. The method comprises receiving an event, splitting the event into a meta part and a content part. The method further comprises comparing the meta part by matching the meta part with meta parts from previous events. The method further comprises determining that the meta part is new, and when the meta part is determined new storing the meta part and the content part. The method further comprises wherein when the meta part is determined not new, comparing the content part by matching with previous content parts with the same meta part. The method further comprises determining that the content part is new, and when the content part is determined new, storing the content part, thereby enabling analysing events in a computer system and presenting events as new.

An advantage with the solution is that computive intensive operations such as analysis, statistics and calculations of events may be done on the limited set of events that has the same metalog in common—that is events that share the key property of having the same structure.

According to another aspect, an apparatus is provided for analysing events in a computer system, wherein the apparatus is arranged to receive an event, to split the event into a meta part and a content part. The apparatus is further arranged to compare the meta part by matching the meta part with meta parts from previous events to determine that the meta part is new, and wherein when the meta part is determined new to store the meta part and the content part. The apparatus is further arranged to wherein when the meta part is determined not new, to compare the content part by matching with previous content parts with the same meta part to determine that the content part is new. The apparatus is further arranged to, wherein when the content part is determined new, store the content part, thereby enabling to analyse events in a computer system and to present events as new.

An advantage with using meta parts as keys and content pars as sub keys is fast finding of meta parts and/or corresponding content parts. Each meta part and corresponding content part may also include other "meta data", such as statistical information, tags etc.

According to another aspect a computer program, comprising computer readable code means, which when run in a apparatus causes the apparatus to perform the corresponding method.

The above method and apparatus may be configured and implemented according to different optional embodiments. For example wherein the comparing of the content part may comprise comparing the content part with other content parts with the same meta part as said content part, may determine existence of at least one parameter of said content part being different from a number of corresponding parameters of said other content parts, may label the at least one parameter of said content part as a dynamic parameter.

When determining that said content part may be new when said content part has at least one new parameter different from said at least one dynamic parameter; and wherein when the content part may be determined new, storing the content part. Further may be determining that the parameter of said content part may be labelled as dynamic if said parameter is within a predefined interval, or may comparing the parameter of said content part with stored parameters for determining that the parameter is within an interval defined by the stored parameters, and wherein when the parameter of said content part may either be labelled as dynamic or within said interval defined by the stored parameters may label said parameter as normal. Further may be analysing the content part and meta part of an event and may be determining similarities and/or differences to content parts and meta parts of previous events, and may give a time stamp label to the event including a frequency of occurrence of the event and a possible change in frequency of occurrence of the event, may present on a Man Machine Interface the time stamp label of content parts and meta parts having differences to content parts and meta parts of previous events, may present on a Man Machine Interface the time stamp label of content parts and meta parts having similarities to content parts and meta parts of previous events, may compare the time stamp of an event having the same content part and meta part as previous events for determining that the time stamp is within a time interval defined by the previous events, and when the time stamp is within said time interval defined by the previous events may label the event as normal. Further may be storing the event for a predefined time interval, when the event may not be labelled as normal, may change the time interval defined by previous events to a time interval comprising the stored event, when the number of stored events may not labelled as normal has reached a predefined number.

Further may be comparing the time stamp of an event may not labelled as normal with a predefined time interval for may determine that the event is within said predefined time interval, may store said event in connection with the predefined time interval, may present on a Man Machine Interface at least one event having the first time stamp occurring in time on said predefined time interval, or may compare the time stamp of an event not labelled as normal with a time interval defined by stored events may not labelled as normal for may determine that the time stamp of the event is within said time interval, may store said event in connection with said time interval defined by stored events, may present on a Man Machine Interface at least one event having the first time stamp occurring approximately in time on said time interval defined by stored events. Further may be incrementing a counter when a meta part or content part may be determined already stored. Further may be performing pre-processing of the event to a consistent encoding, may comprise at least one of the steps: encoding normalisation, normalising the time, normalising the source, defining the structure of the meta part, defining the content part, lookup in a learning database, optionally defining a difference, optionally defining a dynamic parameter, updating a statistical profile.

Further may be presenting on a Man Machine Interface at least one of said meta part, said content part, and said event, thereby may enable identification of an event deviating from previous events. Further may received events may be analysed independent of: format, structure, source or volume. Further may be operating in real time thereby may detect and update incidents as approximately simultaneous.

An advantage with processing raw data according to above approach, without the requirement of parsing or having pre-knowledge of the to-be analysed events, is that it enables analysis of all types of systems and their unique events. Incidents in systems are very often a sequence of events happening across applications, systems and infrastructures. Said approach enables monitoring to be done in a complete, infrastructure-wide and holistic way, thereby having the highest possibility to catch incident root-causes, propagations and impacts. Said approach also allows the lowest level of entry for a system owner, since there are no requirements regarding the format of the data to be processed. This means that system owners can freely choose to construct their events and data in the easiest possible manner. An important characteristic is therefore, as said before, to be able to analyse data and events streaming over different infrastructures. Traditional approaches often have limitations regarding this.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable monitoring a system and automatically tracking events in a system deviating from normal. By splitting events, such as data logs received from a computer system, into a meta part and a content part, it becomes possible to fast monitor and analyse events deviating from normal events. It also becomes possible to analyse and conclude what is dynamic parameters, such as counters and time stamps. Those are by definition changing in a system, but such changes are normal. Where other changes may lead to an intrusion or a system stop, and by identifying events preceding major problems, it may be possible to find a root cause for such major problems.

Figure 1:
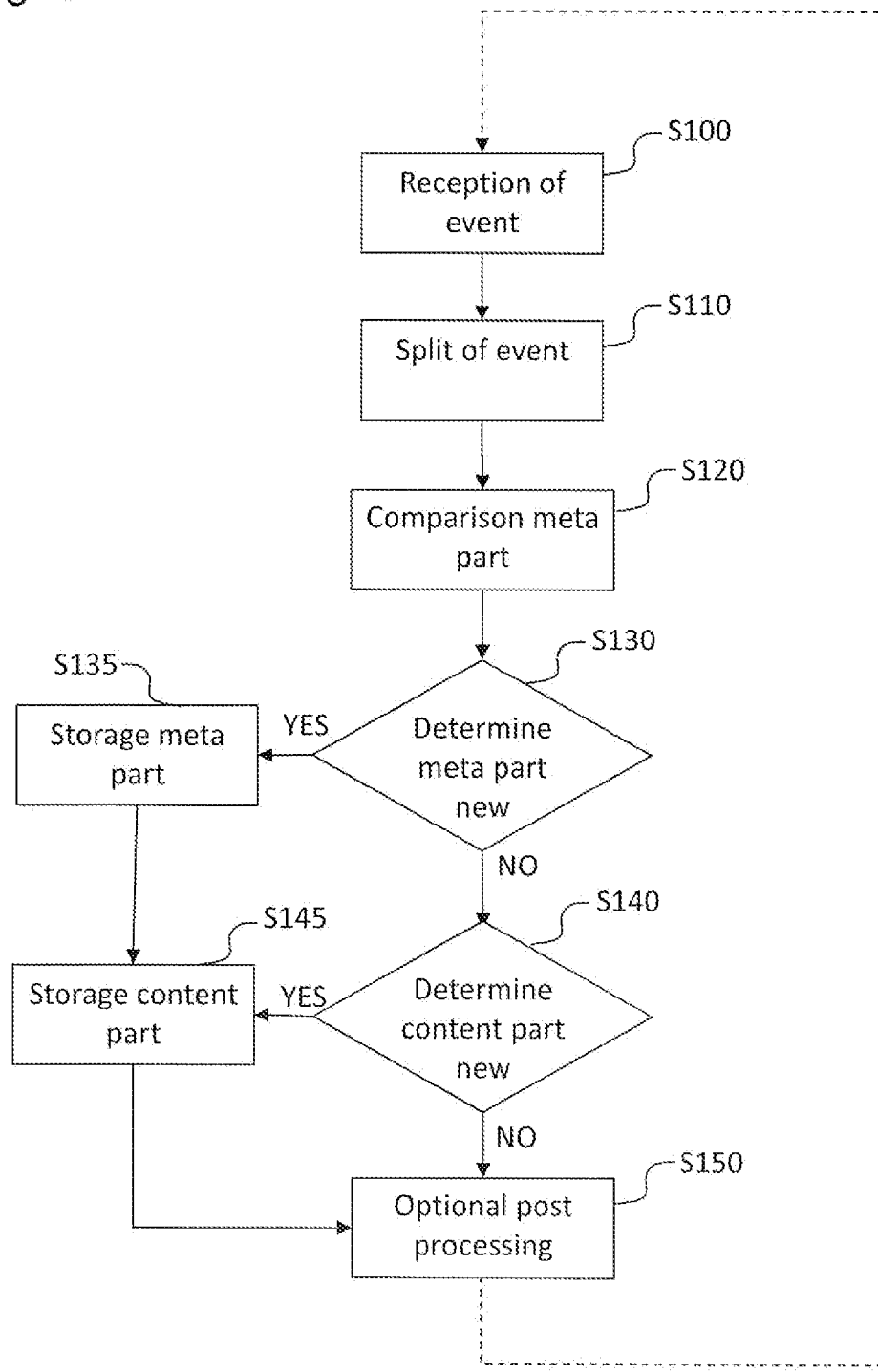
FIG. 1 is a flow chart illustrating a procedure in a node 100, according to a possible embodiment.

FIG. 1 shows a procedure in a node 100 for analysing events in a computer system. Step S100 is the reception of an event. In step S110 the event is split into a meta part and a content part. In step S120 the meta part is compared by matching with meta parts from previous events. In step S130 it is determined if the meta part is new. When the meta part is determined new, it is stored in step S135 in the database 150. In step S140 the content part is compared by matching previous content parts with the same meta part. If the content part is determined new it is stored in step S145 in database 150. In an embodiment, a in step S150, a counter may be incremented, when a content part is determined as not new, to count an occurrence of the particular content part. Various post processing operations may be carried out in this step, This enables identification of an event deviating from previous events in the system, presentation of the new meta part and/or content part, and identification of an event deviating from previous events in the system.

Figure 2:
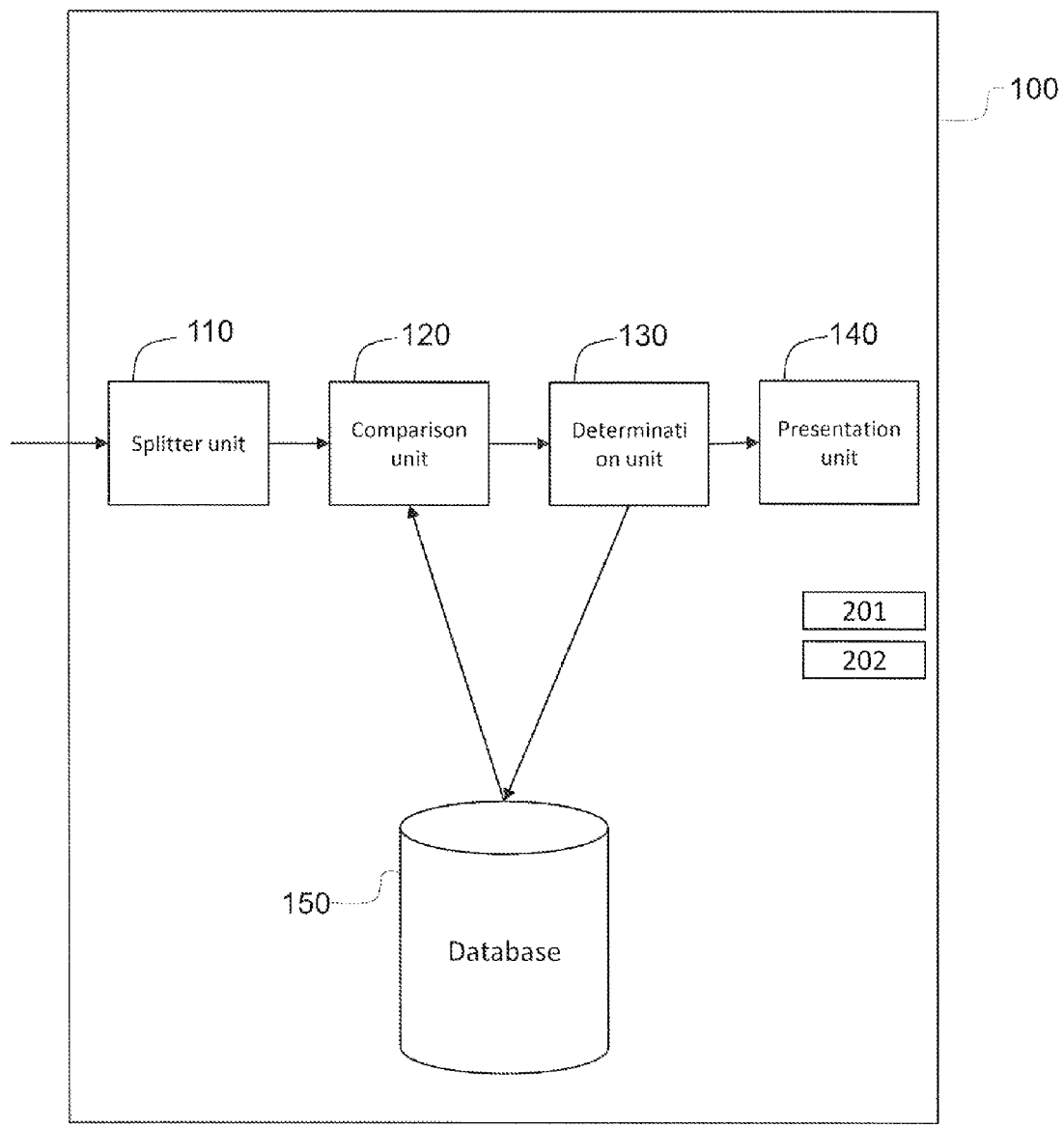
FIG. 2 is a block diagram illustrating units in a node 100, according to a possible embodiment.

FIG. 2 shows various units in a node 100. A node 100 may be arranged for a system for analysing events in a computer system. According to embodiments the node may comprise: a splitter unit 110 for splitting of events, a comparison unit 120 for comparison of new meta parts and new content parts with previous ones in the database 150, and a determination unit 130 for determination if a meta part and/or a content part is new or already existing. In an embodiment the node 100 may include a presentation unit 140, arranged to present new events or events deviating from previous events. The node 100 also shows the already mentioned database 150, arranged for storage of meta parts, content parts, and other data related to a system for analysing events in a computer system.

A real time data analysis engine unit, which also may be referred to as analysis unit, is able to analyse long sequences of events in high velocity event streams for differences compared to what has been seen before. Events may include in this context computer system generated strings that are generated as a response to various internal happenings. Each event may typically represent an action the system has taken on behalf of the system itself or some external input, and is typically technical in nature and typically between 10 to 2500 characters.

In an embodiment of the solution, the solution may be able to remember the events that have flown through the engine, and to be able to quickly determine if the next event can be considered repetitive, somewhat different or fundamentally new and keep a statistical understanding of the frequency of events happening. This is what forms behavioural understanding. A couple of things need to be understood with computer generated events; this explains why this is traditionally very hard to do. Logs may be generated by software, and thus have a very static structure and content. Events typically include various varying parameters that make it hard to compare two events directly with each other. A timestamp for instance, will cause two events with the same meaning to be different in the traditional sense. Other examples of varying parameters can be source port numbers in a firewall log, or a process id in a Unix log. These varying parameters can exists in the beginning, middle and end of the log and cannot be foreseen.

A traditional way of handling this may be to implement an event parser specific for the event stream, such as a Unix system, or a typical brand of firewall, or a specific make and version of a router, where the significant parameters (non varying) are defined by a pattern definition (such as regular expressions). While this may allow for easier comparison between events (since varying parameters are gone) the main problem with this approach is that it requires the development of this event stream-specific parser. Given the amount of data and streams, it is impossible to cover all possible situations which cause parsing based solution to become incomplete, resulting in events being classified as "unknown".

Another option would be to automatically create a pattern definition based on each incoming event with some kind of pattern expression method (like regular expression), which would create a "signature" for each event (n), but this has the issue that each incoming new event would need to be matched to potentially n times causing a huge performance impact. Additionally, it will be hard to define the "signature" without also including the parameters that may be dynamic.

An objective of the solution is to be able to identify repetitive events while handling the situations above.

Figure 3:
FIG. 3 is a flow chart illustrating a procedure in a node, according to further possible embodiments.

FIG. 3 shows an embodiment of optional pre-processing of event to ensure consistent encoding, timestamp with time zone-settings etc. This may be used to optimise the processing of the event.

Figure 4:
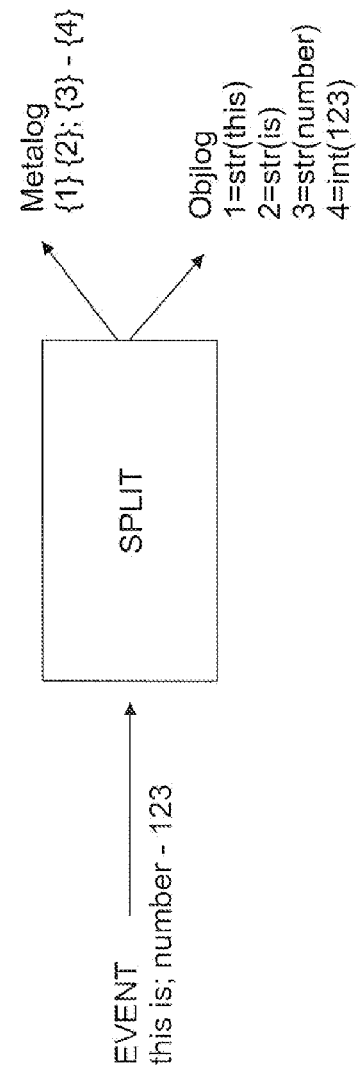
FIG. 4 is an illustrating example of an event split, according to further possible embodiments.

FIG. 4 shows an embodiment of event split—When an event enters the procedure splits the incoming event into a structure definition, also referred to as metalog, or meta part and an object definition, also referred to as objlog, or content part. This split may be done by a splitting definition, whereby two objects metalog and objlog may be created and they may together represent the exact representation of the original log, but may be used for different means. The metalog describes the event structure and may typically be used for identifying similar events without knowing the actual content or attributes of the event. The metalog may not include the actual content, and hence be anonymous and may be further anonymised by cryptographic hashing while still keeping the functionality in place. The objlog, however, may identify the content and all attributes of the event and as such hold the actual meaning of the event based on the specific parameters of the specific event. Examples of meta part are colon (:), semicolon (;), space ( ) comma (,), tab ( ) and similar non-letter/number bases characters or any combination thereof. Examples of content parts are any letter or number type of character, or any combination thereof forming a string.

Figure 5:
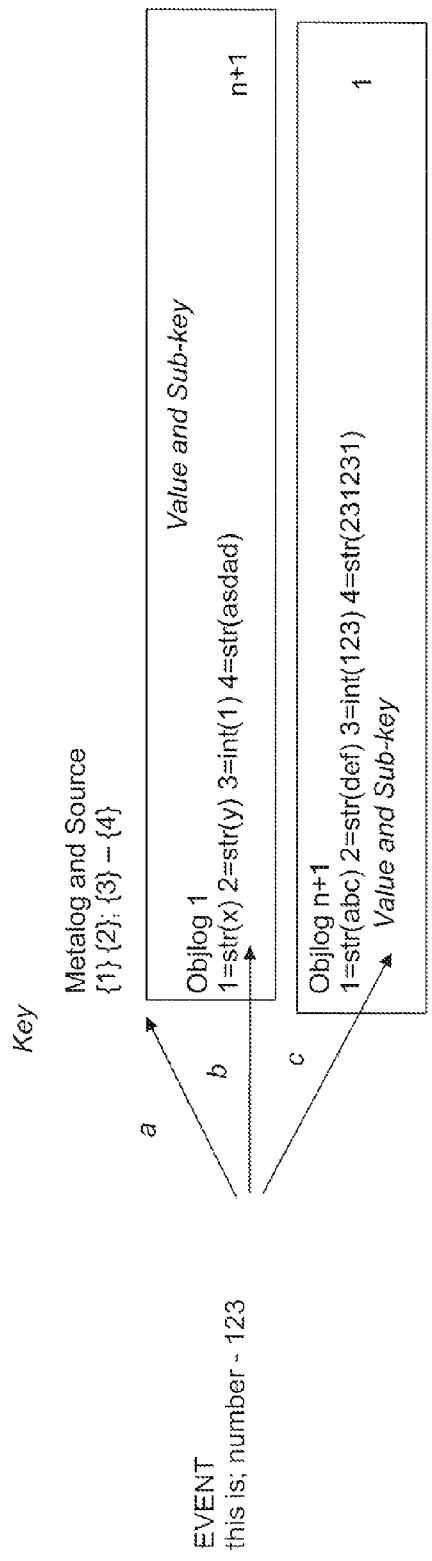
FIG. 5 is an illustrating example of a learning procedure, according to further possible embodiments.

FIG. 5 shows an embodiment of adding to learning database—The metalog and objlog may then be used to save the occurrence into a learning database, which can later be used for determining whether an event has been seen before. This typically happens by a query. This learning database may be a hierarchical structure with metalog (and potentially some other parameter, such as stream Source) as keys and objlogs as sub keys. An advantage with using metalogs as keys and objlogs as sub keys is fast finding of metalog and/or corresponding objlog. Each metalog and corresponding objlogs may also include other "meta data", such as statistical information, tags etc. When a new event arrives, and if the metalog of the current event doesn't exist in the learning database it may be added, and so may be the corresponding objlog. If the metalog exists, the procedure enters the metalog and determines if the current objlog exists in the structure. If it does, it updates the specific objlog statistics, and if it isn't it adds the objlog to the current metalog. This structure and hierarchy facilies a number of things, presented below. A value of the structure is that computationally intensive operations such as analysis, statistics and calculations of events may be done on the limited set of events that has the same metalog in common—that is events that share the key property of having the same structure.

FIG. 5 shows an embodiment of optional difference definition—When the procedure detects an event that hasn't been seen before, i.e. doesn't have the current metalog/objlog-combination in its learning database structure, it determines the difference from what it has previously seen by determining which parameters of its objlog that it doesn't have in common with the other objlogs under the specific metalog. Typically, the difference from the closest match may be saved for usage in other parts of the procedure. If the event produces a new metalog, all parameters may be seen as differing.

Figure 6:
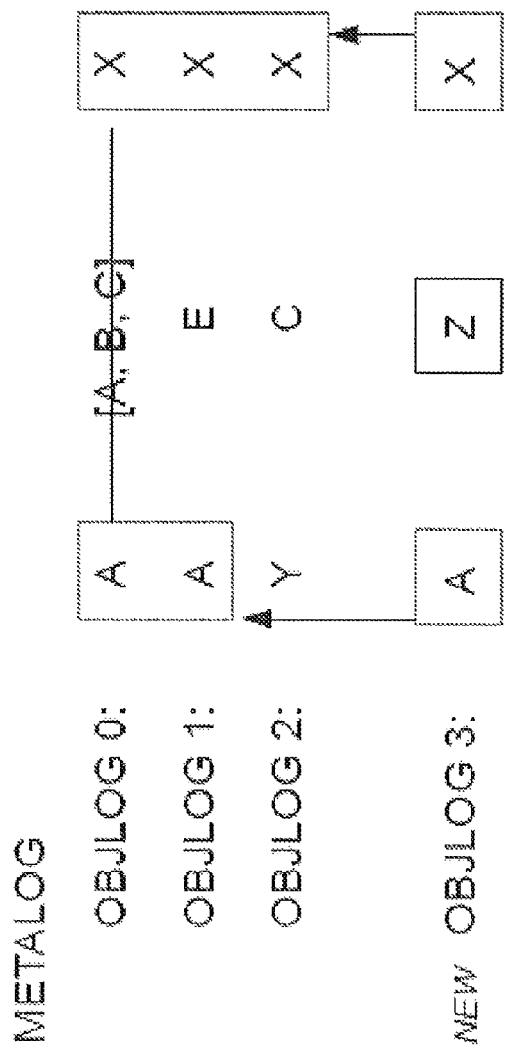
FIG. 6 is an illustrating example of a matching procedure, according to further possible embodiments.

FIG. 6 shows an embodiment of optional definition of dynamic parameters—The metalog and objlog structure may be used to identify if a particular parameter in a set of objlogs are vary random. If a certain parameter position of all, or a part of, objlogs in a metalog each has a unique value it may be considered random (above some statistical threshold) and that parameter may be "replaced" by a placeholder describing the position as dynamic. This allows for consolidating multiple objlogs into one. The placeholder may include an analytical representation of the set, such as integers between values A and B, average, etc. not limiting usage of other integers. New events that perform lookup in the learning database may not need an objlog that has an exact match in all parts of the objlog, but be within the bounds of the analytical results of each parameter.

Figure 7:
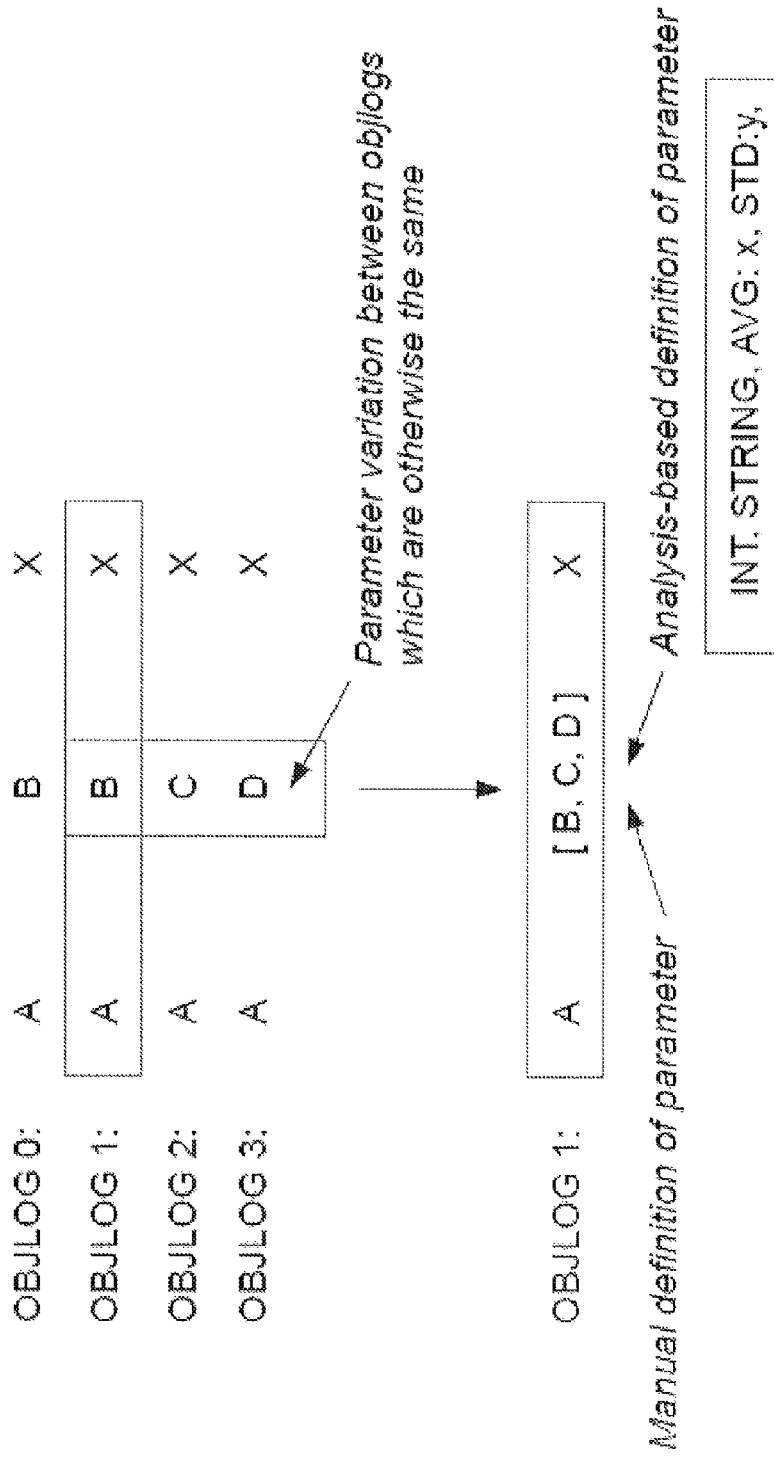
FIG. 7 is an illustrating example of dynamic parameter handling, according to further possible embodiments.

FIG. 7 shows an embodiment of optional event comparison and metadata—A metalog is very significant for the actual event, and may be used for comparison between systems and procedures instances. It may, for example, be possible to determine if two completely separate event streams has produced similar events just by comparing one, some, or all, of their metalogs. This also makes it possible to add meta-information to metalogs, which may, for example, be used for system- or user-generated tagging of events without the need to disclose the actual event. A good example would be that "these set of events are from a Unix system", or "these set of events represent a certain situation, such as a crash or an authentication".

Figure 8:
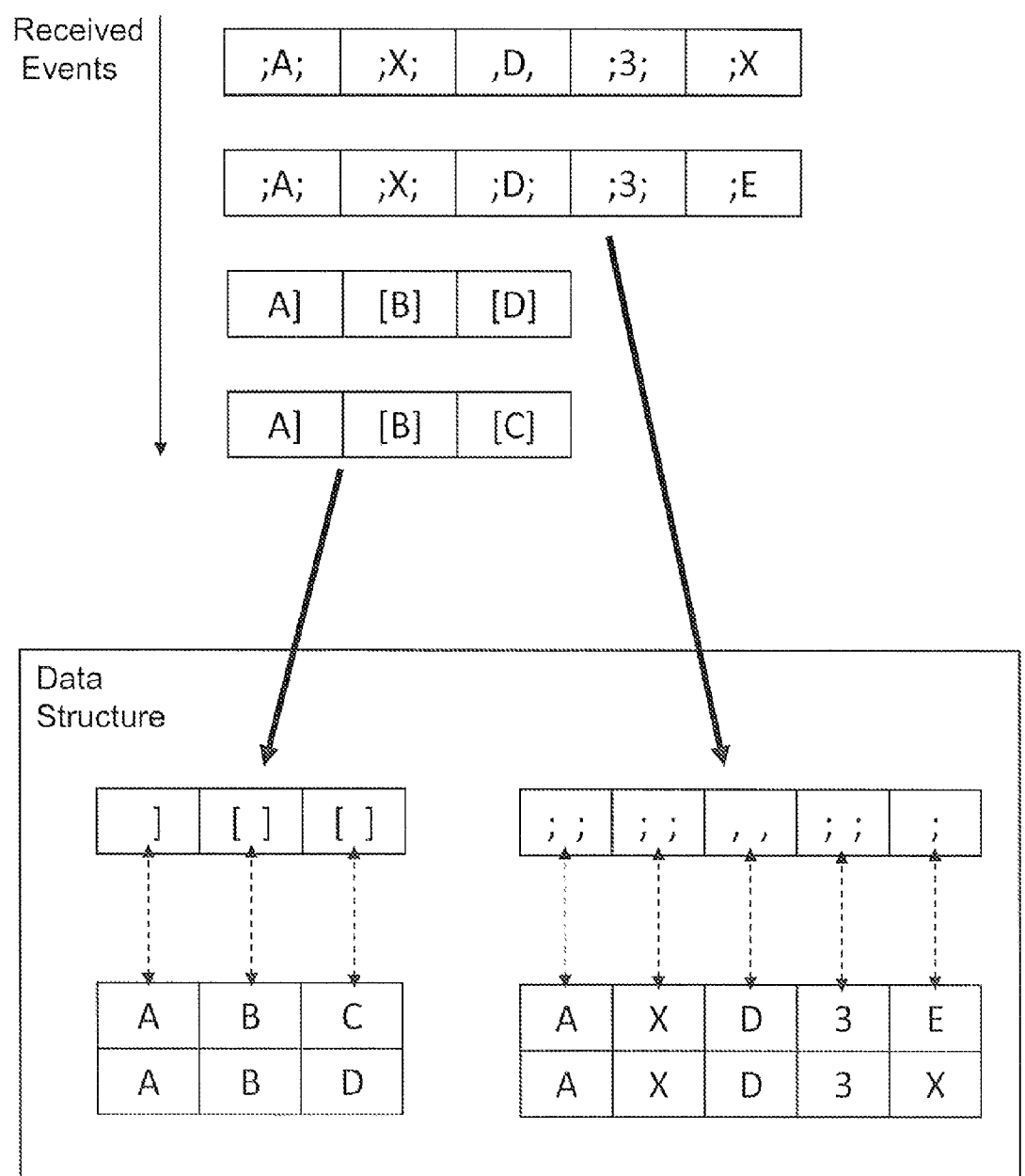
FIG. 8 is an illustrating example of a data structure, according to further possible embodiments.

FIG. 8 shows an embodiment of a data structure on the database 150.

Events may be received in order, where events having the same meta part are arranged such that the accompanying content parts are organised below the meta part. When an event is received with a different meta part than previous, the new meta part is stored, and following content parts stored below the meta part.

In an embodiment, the node 100 comprises a processing unit 201 for execution of instructions of computer program software, according to FIG. 2. The figure further shows a memory unit 202 for storage of a computer program software and cooperation with the processing unit 201. Such processing unit 201 and memory unit 202 may be provided by a general purpose computer, or a computer dedicated for analysing events in a computer system.

Figure 9:
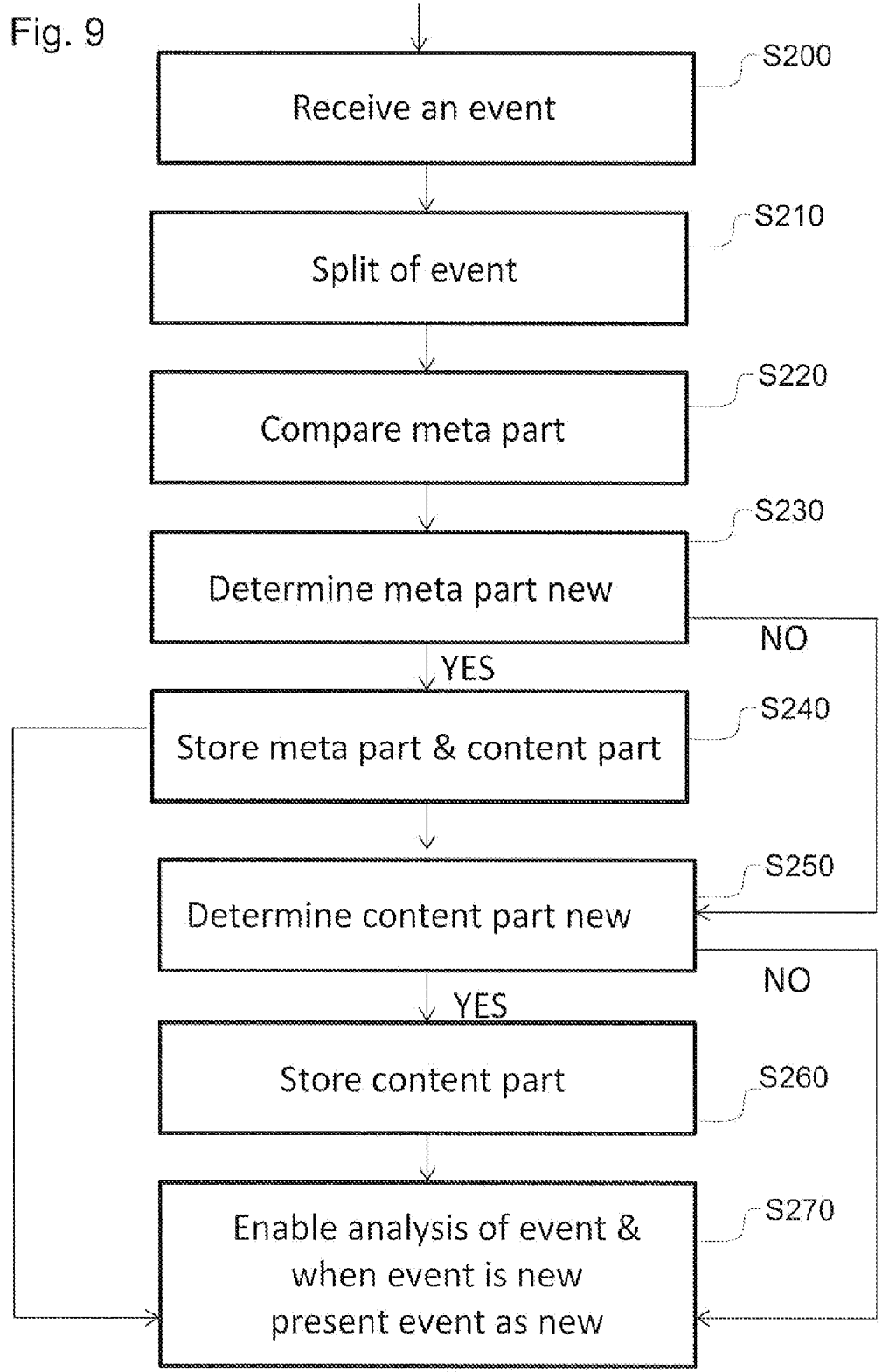
FIG. 9. is a flow chart of a procedure according to an embodiment.

FIG. 9 shows a flow chart illustrating a procedure in a computer system. The various actions may come in different orders than presented in this description, or in a different order than shown in this or other flowcharts related to this description, or some steps may be performed in parallel.

In a step S200 an event is received. The event may also be obtained, requested or retrieved. In a step S210 the event is split into a meta part and a content part. In a step S220 the meta part is compared by matching the meta part with meta parts from previous events. In a step S230 the meta part is determined either new or not new. When the meta part is determined new, the meta part and the content part is stored in step S240. When the meta part is determined not new, in a step S230, the content part is compared in a step S250 by matching with previous content parts with the same meta part for determining that the content part is new. When the content part is determined new, the content part is stored in a step S260. In a step S270 analysing events in a computer system and presenting events as new is enabled.

Figure 10:
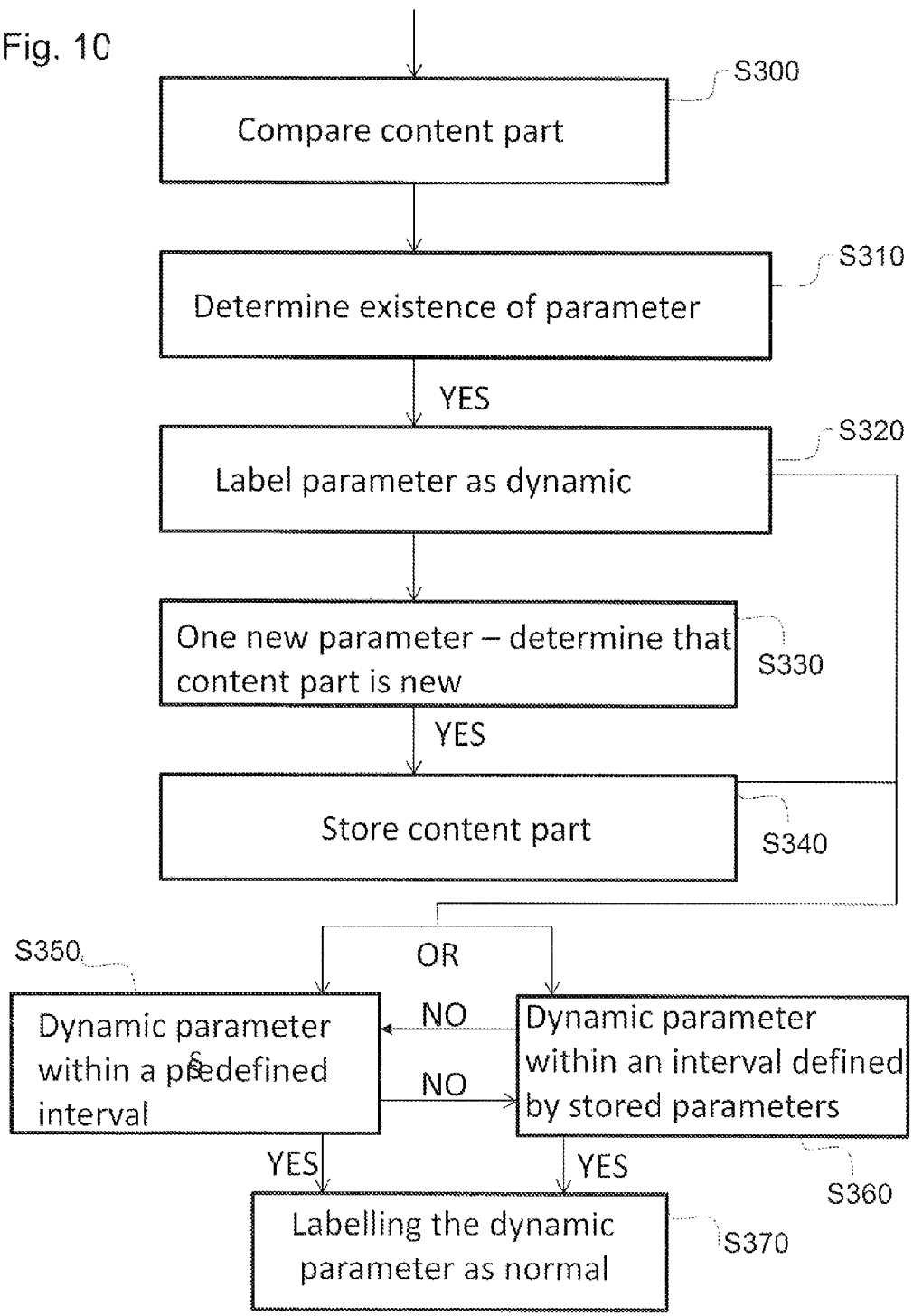
FIG. 10. is a flow chart of a procedure according to an embodiment.

FIG. 10. shows a flow chart illustrating a procedure in a computer system. The various actions may come in different orders than presented in this description, or in a different order than shown in this or other flowcharts related to this description, or some steps may be performed in parallel.

In a step S300 the content part may be compared with other content parts with the same meta part as said content part. In a step S310 the existence of at least one parameter of said content part being different from a number of corresponding parameters of said other content parts may be determined. In a step S320 the at least one parameter of said content part may be labelled as a dynamic parameter. In a step S330 it may be determined that said content part is new when said content part has at least one new parameter different from said at least one dynamic parameter. In a step S340 when the content part may have been determined new, the content part may be stored. In a step S350 it may be determined that the parameter of said content part is labelled as dynamic if said parameter is within a predefined interval. In a step S360 the parameter of said content part with stored parameters may be compared for determining that the parameter is within an interval defined by the stored parameters. In a step S370 when the parameter of said content part may have been labelled either as dynamic or within said interval defined by the stored parameters, said parameter may be labelled as normal.

Figure 11:
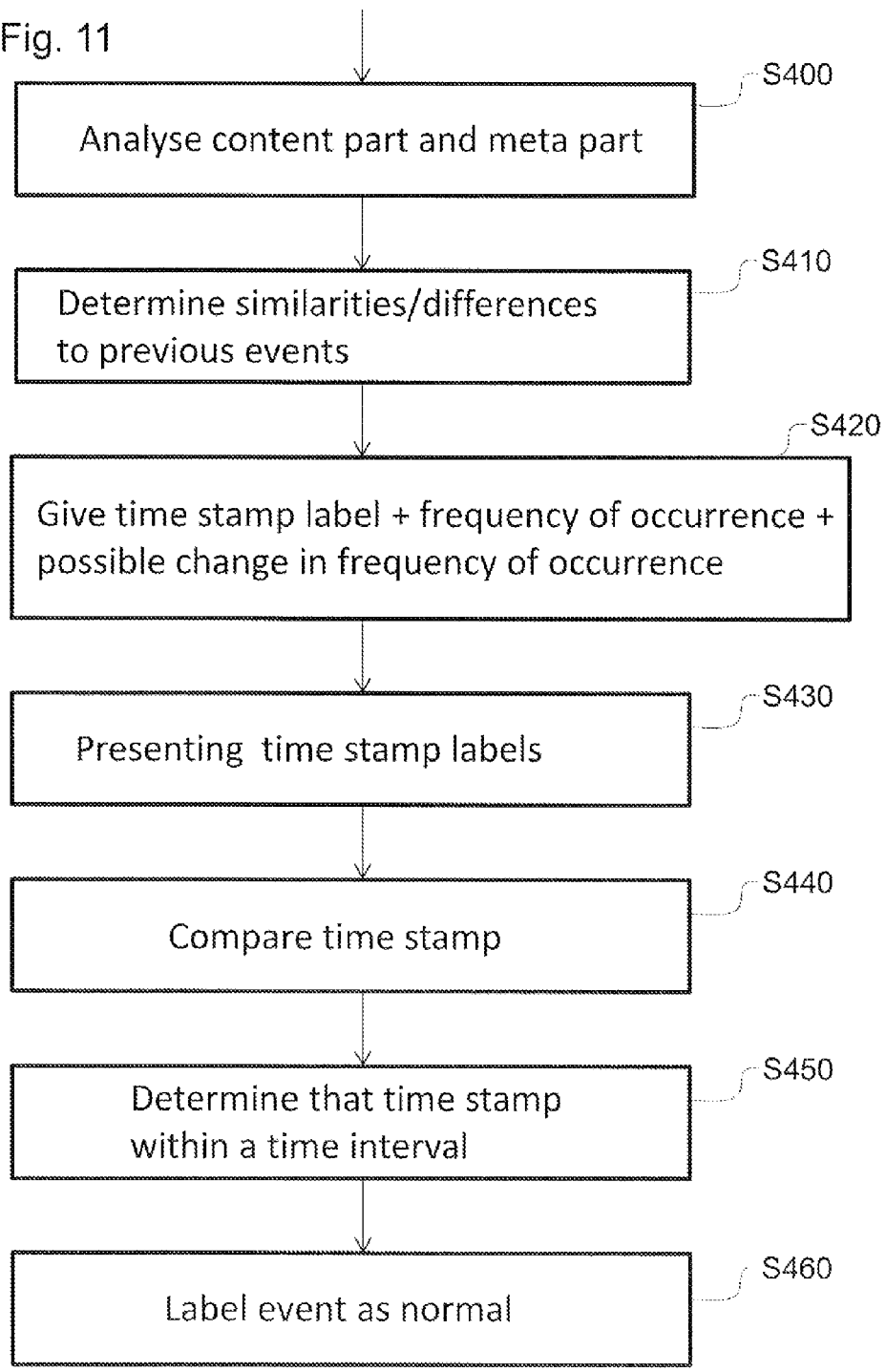
FIG. 11. is a flow chart of a procedure according to an embodiment.

FIG. 11. shows a flow chart illustrating a procedure in a computer system. The various actions may come in different orders than presented in this description, or in a different order than shown in this or other flowcharts related to this description, or some steps may be performed in parallel.

In a step S400 the content part and meta part of an event may be analysed. In a step S410 similarities to and/or differences from content parts and meta parts of previous events may be determined. In a step S420 a time stamp label may be given to the event including a frequency of occurrence of the event and a possible change in frequency of occurrence of the event. In a step S430 the time stamp label of content parts and meta parts having differences to content parts and meta parts of previous events may be presented on a Man Machine Interface. In a step S430 the time stamp label of content parts and meta parts having similarities to content parts and meta parts of previous events may be presented on a Man Machine Interface. In a step S440 the time stamp of an event having the same content part and meta part as previous events may be compared with a time interval defined by the previous events. In a step S450 it may be determined that the time stamp is within a time interval defined by the previous events. In a step S460 the event may be labelled as normal when the time stamp is within said time interval defined by the previous events.

Figure 12:
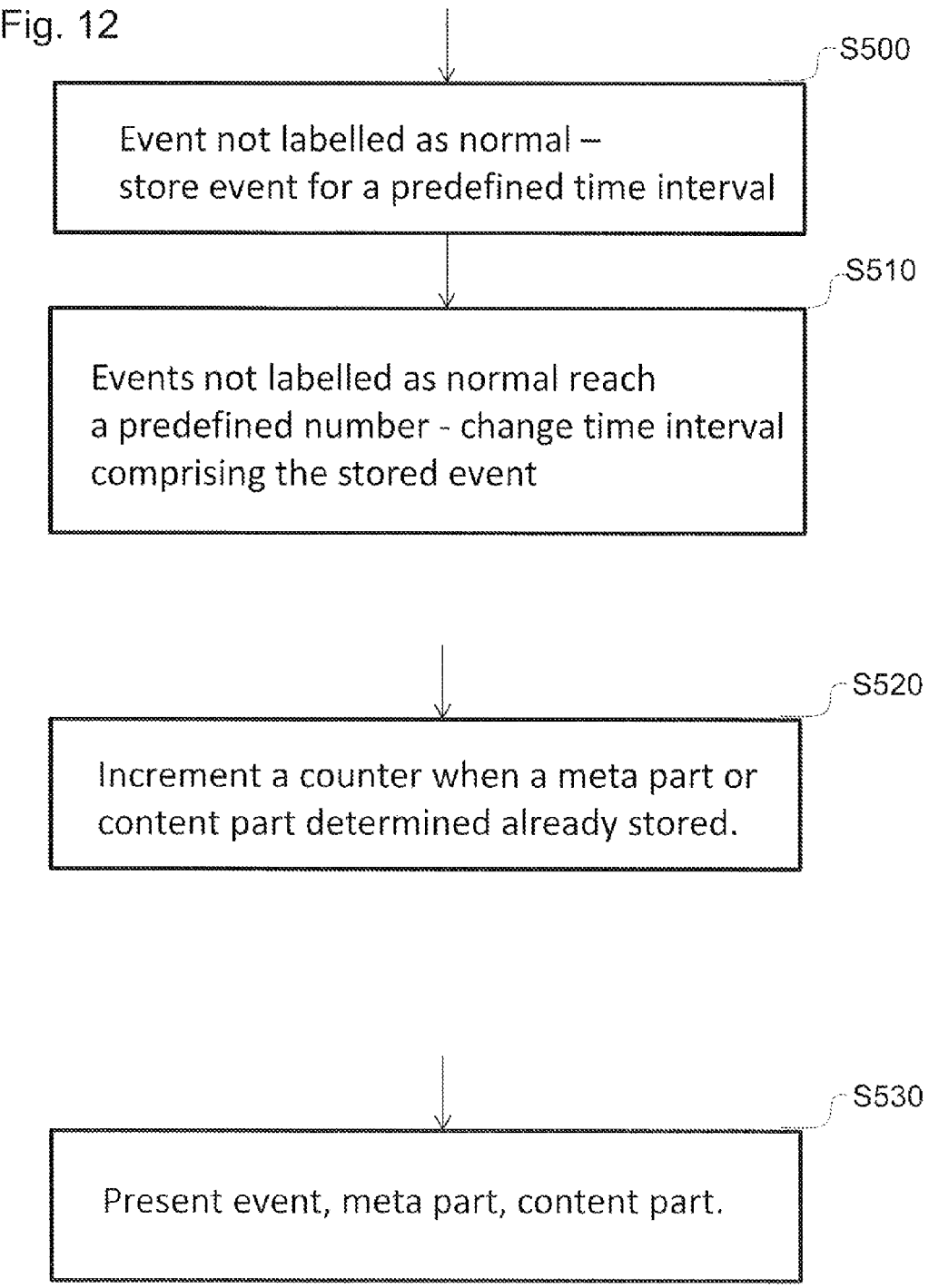
FIG. 12. is a flow chart of a procedure according to an embodiment.

FIG. 12. shows a flow chart illustrating a procedure in a computer system. The various actions may come in different orders than presented in this description, or in a different order than shown in this or other flowcharts related to this description, or some steps may be performed in parallel.

In a step S500 the event may be stored for a predefined time interval, when the event is not labelled as normal. In a step S510 the time interval defined by previous events may be changed to a time interval comprising the stored event, when the number of stored events not labelled as normal has reached a predefined number.

In a step S520 a counter may be incremented when a meta part or content part may have been determined already stored.

In a step S530 at least one of said meta part, said content part, and said event may be presented on a Man Machine Interface, thereby enabling identification of an event deviating from previous events.

Figure 13:
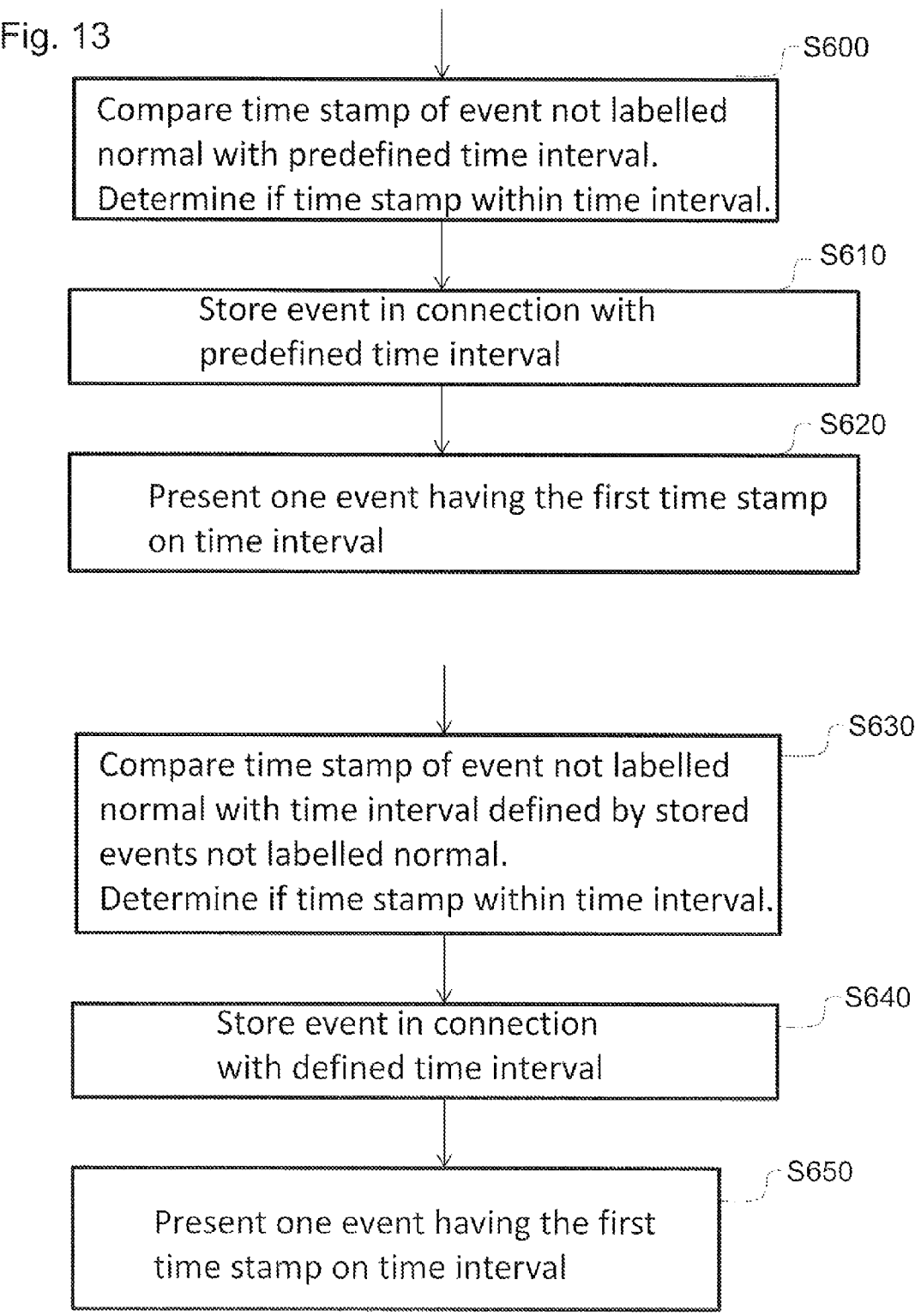
FIG. 13. is a flow chart of a procedure according to an embodiment.

FIG. 13. shows a flow chart illustrating a procedure in a computer system. The various actions may come in different orders than presented in this description, or in a different order than shown in this or other flowcharts related to this description, or some steps may be performed in parallel.

In a step S600 the time stamp of an event not labelled as normal may be compared with a predefined time interval for determining that the event is within said predefined time interval. In a step S610 said event may be stored in connection with the predefined time interval. In a step S620 at least one event having the first time stamp occurring during said predefined time interval may be presented on a Man Machine Interface. In a step S630 the time stamp of an event not labelled as normal may be compared with a time interval defined by stored events not labelled as normal for determining that the time stamp of the event is within said time interval. In a step S640 said event in connection with said time interval defined by stored events may be stored. In a step S650 at least one event having the first time stamp occurring approximately in time on said time interval defined by stored events may be presented on a Man Machine Interface.

Figure 14:
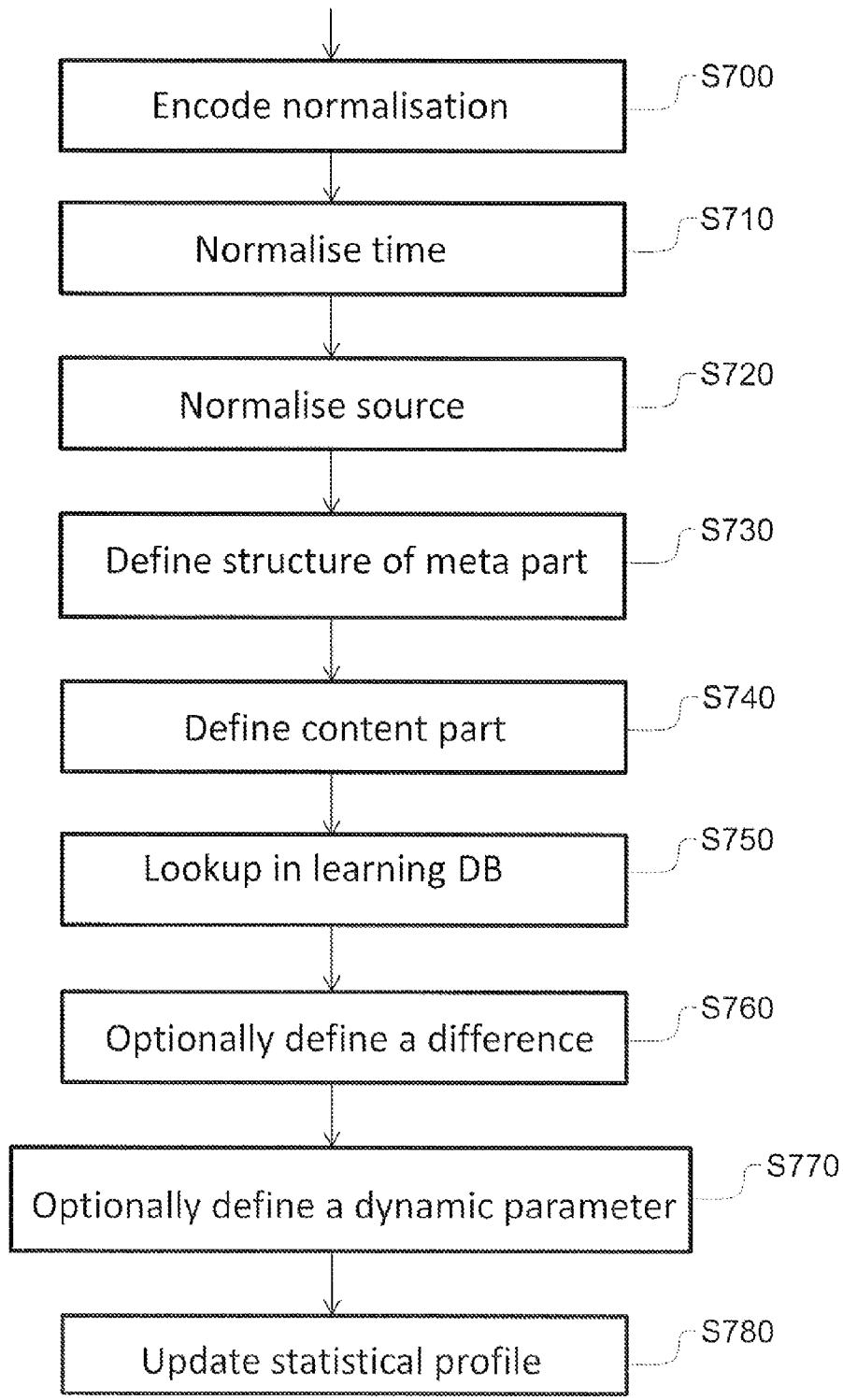
FIG. 14. is a flow chart of a procedure according to an embodiment.

FIG. 14. shows a flow chart illustrating a procedure in a computer system. The various actions may come in different orders than presented in this description, or in a different order than shown in this or other flowcharts related to this description, or some steps may be performed in parallel.

In a step S700 normalisation may be encoded. In a step S710 the time may be normalised. In a step S720 the source may be normalised. In a step S730 the structure of the meta part may be defined. In as step S740 the content part may be defined. In a step S750 lookup in a learning database may be conducted. In a step S760 optionally a difference may be defined. In a step S770 optionally a dynamic parameter may be defined. In a step S780 a statistical profile may be updated.

Meta parts and content parts that have been analysed by the system may be labelled either normal or not normal. Furthermore, information, such as time stamps, about when specific combinations of meta parts and content parts have occurred, may be used to label events of their frequency by giving these labels such as "occurrence each second", "occurrence each minute", "occurrence each hour", "occurrence each day" and so forth. This information may be presented to the system owners or the system itself for further processing. This allows a system owner to better understand the nature of the system, as the frequency labels give a structured picture compared to previous analysis software which often presents random events or count based presentations which do not offer a thorough analysis. Presenting these frequency labels for all gathered content and meta part combinations would further allow a behavioural understanding of a system.

Changes in the frequency of an event may also carry valuable information to be alerted and reported on. A change in frequency of an event might be seen as a frequency anomaly which implies that something has changed in the system. Analysis of frequency changes may need to take into account normal data variations. It may also be beneficial to implement some lag in the system for it not to respond to non important variations. This might be achieved by challenging an existing frequency of an event with a new identified frequency for a predefined and limited time. A number of events may occur for instance during a 10 seconds time slot. There could for instance be a minute between the end of a previous slot and the beginning of subsequent slot. The system then may identify an event occurring between one of these slots, and may issue a challenge on the 10 seconds/1 minute cycle. If the challenge is not verified, i.e. the event does not occur again in the same manner in between the slots for a predefined period of time, e.g. four 10 seconds/1 minute cycles, the event may be labelled as an anomaly.

However, if the event occurs again during the predefined period of time, the challenge may be taken into account seriously and the system might change the defined cycle.

Data may be presented on a Man Machine Interface such as a Graphical Interface, a monitor and paper. Data may also be exported to other systems and databases.

All data which is labelled, can for instance also be marked or tagged.

All data which is analysed can for instance be monitored.

Monitoring of information technology infrastructure, such as servers, switches, routers and workstations, business systems and transaction systems, not limiting other types of similar units, typically consists also of the following approach:

System monitoring: Collects information from one or more systems, which for example may include: CPU, disk space, memory usage, and may warn if this approaches 100% (or "too much"). It may also warn if a system cannot be reached by continuously polling infrastructure.

A decreased detection capability may sometimes be called false negatives.

Each event may typically represent an action the system has taken on behalf of the system itself or some external input, and is typically technical in nature and typically between 10 to 2500 characters. However, the number of characters is not limited to this interval.

Examples of content parts may be any letter or number type of character, or any combination thereof forming a string.

According to one aspect, a method is provided for analysing events in a computer system, the method comprises receiving an event, splitting the event into a meta part and a content part. The method further comprises comparing the meta part by matching with meta parts from previous events. The method further comprises determining if the meta part is new, and when the meta part is determined new, storing the meta part. The method further comprises comparing the content part by matching with previous content parts the same meta part. The method further comprises determining if the content part is new, and when the content part is determined new, storing the content part, thereby enabling identification of an event deviating from previous events in the system.

According to another aspect, a system is provided for analysing events in a computer system. The system is arranged for reception of an event, splitting the event into a meta part and an content part. The system is further arranged for comparison of the meta part by matching with meta parts from previous events. The system is further arranged for determination of if the meta part is new, and when the meta part is determined new, storing the meta part. The system is further arranged for comparison of the content part by matching with previous content parts the same meta part. The system is further arranged for determination of if the content part is new, and when the content part is determined new, storing the content part, thereby enabling identification of an event deviating from previous events in the system.

According to another aspect, a computer program, comprising computer readable code means for analysing events in a computer system, which when run in a system for analysing events in a computer system causes the system for analysing events in a computer system to perform the following steps: receiving an event, splitting the event into a meta part and an content part. The computer program further comprises comparing the meta part by matching with meta parts from previous events. The computer program further comprises determining if the meta part is new, and when the meta part is determined new storing the meta part. The computer program further comprises comparing the content part by matching with previous content parts with the same meta part. The computer program further comprises determining if the content part is new, and when the content part is determined new, storing the content part thereby enabling identification of an event deviating from previous events in the system.

According to another aspect, a computer program product is provided. The computer program product comprising a computer readable medium and a computer program, wherein the computer program is stored on the computer readable medium.

The above method, system and computer program may be configured and implemented according to different optional embodiments. In one possible embodiment, a counter is incremented, or similar statistical values are updated, when a meta part or a content part is determined not new. An embodiment comprises optionally performance of various other processing steps on the event. An embodiment comprises presenting the new meta part and/or content part, thereby enabling identification of an event deviating from previous events in the system. An embodiment comprises analyses of any incoming event with no prerequisites on the format, structure, source or volume. An embodiment comprises that the solution operates in real time and detects and updates incidents as they happen. An embodiment comprises that the solution automatically analyses events and event sequences for similarities and differences, and produces an unbiased view of what is normal and not in the event stream(s). An embodiment comprises that the solution is able learn the events that is has seen before, and uses this knowledge to determine whether new events are repetitions of old events, are completely new or have some attribute that is different from before. An embodiment comprises that the solution requires no continuous configuration of its detection capability, which means there are no continuous operational costs with regards to maintaining the detection capability. An embodiment comprises that the solution delivers real time root-cause analysis which removes the need for this analysis manually. Additionally, it provides actionable information in real time instead of having to wait for business impact (the effect) to get this information.

It should be noted that FIG. 2 illustrates various functional units in the node 100 and the skilled person is able to implement these functional units in practice using suitable software and hardware means. Thus, this aspect of the solution is generally not limited to the shown structures of node 100, and the database 150 may be configured to operate according to any of the features described in this disclosure, where appropriate. It should be understood that practical implementation of a method system and computer program for analysing events in a computer system, may be carried out in various ways. The skilled person knows how to architect and implement the system according to requirements on scalability, performance, robustness, etc. It may be implemented on a local personal computer, or a large scale server computer, or a number of distributed clustered computers in a communications network, to give a few examples.

In the above description, for purposes of explanation and not limitation, specific details are set forth such as particular solutions, architectures, structures, interfaces, techniques, etc. in order to provide a thorough understanding of the present invention. However, it will be apparent to those skilled in the art that the present invention may be practiced in other embodiments that depart from these specific details.

That is, those skilled in the art will be able to devise various systems or combinations which, although not explicitly described or shown herein, embody the principles of the invention and are included within its spirit and scope. In some instances, detailed descriptions of well-known devices, databases, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that figures herein can represent conceptual views of illustrative systems or other functional units embodying the principles of the technology. Similarly, it will be appreciated that any flow charts, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware implemented and/or computer implemented, and thus machine-implemented.

In terms of hardware implementation, the functional blocks may include or encompass, without limitation, digital signal processor (DSP) hardware, reduced instruction set processor, hardware (e.g., digital or analog) circuitry, and (where appropriate) state machines capable of performing such functions.

One exemplary, non-limiting feature of the technology disclosed herein concerns a method provided for analysing events in a computer system.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a system or method to address each and every problem sought to be solved by the present invention, for it to be encompassed hereby.

While the solution has been described with reference to specific exemplary embodiments, the description is generally only intended to illustrate the inventive concept and should not be taken as limiting the scope of the solution. For example, the terms "meta part", "content part" and "event" have been used throughout this description, although any other corresponding nodes, functions, and/or parameters could also be used having the features and characteristics described here. The solution is defined by the appended claims.

We claim:

1. A method for analysing events in a computer system, the method comprising:
   receiving an event;
   splitting the event into a meta part and a content part, the meta part comprising non-content of the event including at least one of: non-letter/number character, colon (:), semicolon (;), space ( ) comma (,), tab ( ), and a cryptographic hash;
   comparing the meta part by matching the meta part with meta parts from previous events for determining that the meta part is new, and wherein when the meta part is determined new;
   storing the meta part and the content part; wherein
      when the meta part is determined not new, comparing the content part by matching with previous content parts with the same meta part for determining that the content part is new,
      comparing the content part with other content parts with the same meta part as said content part,
      determining existence of at least one parameter of said content part being different from a number of corresponding parameters of said other content parts, and when a difference is determined for the at least one parameter determine a parameter variation between content parts which are otherwise the same,
      labelling the at least one parameter of said content part as a dynamic parameter,
      determining that said content part is new when said content part has at least one new parameter different from said at least one dynamic parameter, and
      when the content part is determined new, storing the content part, thereby enabling analysing events in a computer system and presenting events as new.

2. The method according to claim 1, comprising:
   determining that the parameter of said content part is labelled as dynamic if said parameter is within a predefined interval; or
   comparing the parameter of said content part with stored parameters for determining that the parameter is within an interval defined by the stored parameters; and wherein
   when the parameter of said content part is either labelled as dynamic or within said interval defined by the stored parameters labelling said parameter as normal.

3. The method according to claim 1, comprising:
   analysing the content part and meta part of an event and determining similarities and/or differences to content parts and meta parts of previous events, and giving a time stamp label to the event including a frequency of occurrence of the event and a possible change in frequency of occurrence of the event;
   presenting on a Man Machine Interface the time stamp label of content parts and meta parts having differences to content parts and meta parts of previous events;
   presenting on a Man Machine Interface the time stamp label of content parts and meta parts having similarities to content parts and meta parts of previous events;
   comparing the time stamp of an event having the same content part and meta part as previous events for determining that the time stamp is within a time interval defined by the previous events; and
   when the time stamp is within said time interval defined by the previous events labelling the event as normal.

4. The method according to claim 3, comprising:
storing the event for a predefined time interval, when the event is not labelled as normal; and
changing the time interval defined by previous events to a time interval comprising the stored event, when the number of stored events not labelled as normal has reached a predefined number.

5. The method according to claim 4, comprising:
comparing the time stamp of an event not labelled as normal with a predefined time interval for determining that the event is within said predefined time interval;
storing said event in connection with the predefined time interval; and
presenting on a Man Machine Interface at least one event having the first time stamp occurring in time on said predefined time interval; or
comparing the time stamp of an event not labelled as normal with a time interval defined by stored events not labelled as normal for determining that the time stamp of the event is within said time interval;
storing said event in connection with said time interval defined by stored events; and
presenting on a Man Machine Interface at least one event having the first time stamp occurring approximately in time on said time interval defined by stored events.

6. The method according to claim 1, comprising:
incrementing a counter when a meta part or content part is determined already stored.

7. The method according to claim 1, comprising:
performing pre-processing of the event to a consistent encoding, comprising at least one of the steps:
encoding normalisation
normalising the time
normalising the source
defining the structure of the meta part
defining the content part
lookup in a learning database
Optionally defining a difference
Optionally defining a dynamic parameter, and
updating a statistical profile.

8. The method according to claim 1, comprising:
presenting on a Man Machine Interface at least one of said meta part, said content part, and said event, thereby enabling identification of an event deviating from previous events.

9. The method according to claim 1, wherein:
received events are analysed independent of: format, structure, source or volume.

10. The method according to claim 1, comprising:
operating in real time thereby detecting and updating incidents as approximately simultaneous.

11. An apparatus for analysing events in a computer system, comprising a processor and a memory, said memory containing instructions executable by said processor, whereby:
the apparatus is arranged to receive an event;
the apparatus is arranged to split the event into a meta part and a content part, the meta part comprising non-content of the event including at least one of: non-letter/number character, colon (:), semicolon (;), space H, comma (,), tab ( ), and a cryptographic hash;
the apparatus is arranged to compare the meta part by matching the meta part with meta parts from previous events to determine that the meta part is new, and wherein when the meta part is determined new;
the apparatus is arranged to store the meta part and the content part;
wherein when the meta part is determined not new, the apparatus is arranged to compare the content part by matching with previous content parts with the same meta part to determine that the content part is new,
the apparatus being arranged to compare the content part with other content parts with the same meta part as said content part;
the apparatus being arranged to determine existence of at least one parameter of said content part being different from a number of corresponding parameters of said other content parts, and when a difference is determined for the at least one parameter determine a parameter variation between content parts which are otherwise the same;
the apparatus being arranged to label the at least one parameter of said content part as a dynamic parameter;
the apparatus is arranged to determine that said content part is new when said content part has at least one new parameter different from said at least one dynamic parameter; and
wherein when the content part is determined new; the apparatus is arranged to store the content part, thereby enabling to analyse events in a computer system and to present events as new.

12. The apparatus according to claim 11, wherein:
the apparatus is arranged to determine that the parameter of said content part is labelled as dynamic if said parameter is within a predefined interval; or
the apparatus is arranged to compare the parameter of said content part with stored parameters to determine that the parameter is within an interval defined by the stored parameters; and wherein
when the parameter of said content part is either labelled as dynamic or within said interval defined by the stored parameters, the apparatus is arranged to label said parameter as normal.

13. The apparatus according to claim 11, wherein:
the apparatus is arranged to analyse the content part and meta part of an event and determine similarities and/or differences to content parts and meta parts of previous events, and give a time stamp label to the event including a frequency of occurrence of the event and a possible change in frequency of occurrence of the event;
the apparatus is arranged to present on a Man Machine Interface the time stamp label of content parts and meta parts having differences to content parts and meta parts of previous events;
the apparatus is arranged to present on a Man Machine Interface the time stamp label of content parts and meta parts having similarities to content parts and meta parts of previous events;
the apparatus is arranged to compare the time stamp of an event having the same content part and meta part as previous events to determine that the time stamp is within a time interval defined by the previous events; and
when the time stamp is within said time interval defined by the previous events, the apparatus is arranged to label the event as normal.

14. The apparatus according to claim 13, wherein:
the apparatus is arranged to store the event for a predefined time interval, when the event is not labelled as normal; and
the apparatus is arranged to change the time interval defined by previous events to a time interval comprising the stored event, when the number of stored events not labelled as normal has reached a predefined number.

15. The apparatus according to claim 14, wherein:
the apparatus is arranged to compare the time stamp of an event not labelled as normal with a predefined time interval to determine that the event is within said predefined time interval;
the apparatus is arranged to store said event in connection with the predefined time interval; and
the apparatus is arranged to present on a Man Machine Interface at least one event having the first time stamp occurring in time on said predefined time interval; or
the apparatus is arranged to compare the time stamp of an event not labelled as normal with a time interval defined by stored events not labelled as normal, the apparatus is arranged to determine that the time stamp of the event is within said time interval;
the apparatus is arranged to store said event in connection with said time interval defined by stored events; and
the apparatus is arranged to present on a Man Machine Interface at least one event having the first time stamp occurring approximately in time on said time interval defined by stored events.

16. The apparatus according to claim 11, wherein:
the apparatus is arranged to increment a counter when a meta part or content part is determined already stored.

17. The apparatus according to claim 11, wherein:
the apparatus is arranged to perform pre-processing of the event to a consistent encoding, comprising at least one of the steps wherein:
the apparatus is arranged to encode normalisation
the apparatus is arranged to normalise the time
the apparatus is arranged to normalise the source
the apparatus is arranged to define the structure of the meta part
the apparatus is arranged to define the content part
the apparatus is arranged to lookup in a learning database
the apparatus is arranged to optionally define a difference
the apparatus is arranged to optionally define a dynamic parameter, and
the apparatus is arranged to update a statistical profile.

18. The apparatus according to claim 11, wherein:
the apparatus is arranged to present on a Man Machine Interface at least one of said meta part, said content part, and said event, thereby enabling identification of an event deviating from previous events.

19. The apparatus according to claim 11, wherein:
the apparatus is arranged to analyse received events independent of: format, structure, source or volume.

20. The apparatus according to claim 11, wherein:
the apparatus is arranged to operate in real time thereby detecting and updating incidents as approximately simultaneous.

* * * * *